(12) United States Patent
Pannell et al.

(10) Patent No.: US 8,848,706 B1
(45) Date of Patent: **\*Sep. 30, 2014**

(54) CONSOLE WITH NETWORK DEVICE BASED FRAME ROUTING ACCORDING TO REMOTELY RECEIVED SWITCH INFORMATION

(75) Inventors: Donald Pannell, Cupertino, CA (US); Partho Mishra, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 81 days.

This patent is subject to a terminal disclaimer.

(21) Appl. No.: 13/590,455

(22) Filed: Aug. 21, 2012

Related U.S. Application Data

(63) Continuation of application No. 11/389,293, filed on Mar. 24, 2006, now Pat. No. 8,249,064.

(60) Provisional application No. 60/697,698, filed on Jul. 8, 2005, provisional application No. 60/696,452, filed on Jul. 1, 2005, provisional application No. 60/695,290, filed on Jun. 30, 2005, provisional application No. 60/695,329, filed on Jun. 29, 2005.

(51) Int. Cl.
*H04L 12/56* (2006.01)

(52) U.S. Cl.
USPC .......................... 370/389; 370/349; 370/392

(58) Field of Classification Search
USPC ....................................................... 370/389
See application file for complete search history.

(56) References Cited

U.S. PATENT DOCUMENTS

| | | | |
|---|---|---|---|
| 5,742,604 A | 4/1998 | Edsall et al. | |
| 5,912,891 A | 6/1999 | Kanai | |
| 6,636,499 B1 | 10/2003 | Dowling | |
| 6,654,796 B1 | 11/2003 | Slater et al. | |
| 6,744,783 B1 | 6/2004 | Tzeng | |
| 6,980,547 B1 | 12/2005 | Gally et al. | |
| 7,170,885 B2 | 1/2007 | Hirota et al. | |
| 7,251,217 B2 | 7/2007 | Wong et al. | |
| 7,420,527 B2 | 9/2008 | Sato et al. | |
| 7,475,177 B2 | 1/2009 | Benner et al. | |
| 7,539,134 B1 | 5/2009 | Bowes | |
| 8,249,064 B1 * | 8/2012 | Pannell et al. | 370/389 |
| 2005/0099983 A1 | 5/2005 | Nakamura et al. | |
| 2005/0122966 A1 | 6/2005 | Bowes | |

FOREIGN PATENT DOCUMENTS

WO    WO96/15608    5/1996

\* cited by examiner

*Primary Examiner* — Dang Ton
*Assistant Examiner* — Pamit Kaur

(57) ABSTRACT

A console is provided and includes a switch and a network device. The network device includes a switch port, first network ports, and a controller. The switch is separate from the network device. Each of the first network ports receives a frame of data, and inserts source information into the frame of data. The source information in each frame of data identifies the first network port that received the frame of data. The controller transfers each frame of data, including the source information, to the switch via the switch port. The switch: adds to each frame of data, destination information identifying one or more of the first network ports; and transfers each frame of data, including the source and destination information, to the switch port. The controller transfers each frame of data, received from the switch port, to the first network ports.

20 Claims, 8 Drawing Sheets

CONSOLE WITH NETWORK DEVICE BASED FRAME ROUTING ACCORDING TO REMOTELY RECEIVED SWITCH INFORMATION

CROSS-REFERENCE TO RELATED APPLICATIONS

This application is a continuation of U.S. patent application Ser. No. 11/389,293, filed Mar. 24, 2006, which claims the benefit of U.S. Provisional Patent Application Ser. Nos. 60/695,329 filed Jun. 29, 2005; 60/695,290 filed Jun. 30, 2005; 60/696,452 filed Jul. 1, 2005; and 60/697,698 filed Jul. 8, 2005, the disclosures thereof incorporated by reference herein in their entirety.

FIELD

The present disclosure relates generally to data communications. More particularly, the present disclosure relates to remote switching.

SUMMARY

A console is provided and includes a switch and a network device. The network device includes a switch port, first network ports, and a controller. The switch port is in communication with the switch. The switch is separate from the network device. Each of the first network ports is configured to (i) receive a frame of data, and (ii) insert source information into the frame of data. The source information in each frame of data received by the first network ports identifies the first network port that received the frame of data. The controller is configured to transfer each frame of data, including the source information, to the switch via the switch port. The switch is configured to: add to each frame of data transferred to the switch, destination information identifying one or more of the first network ports; and transfer each frame of data, including both the source information and the destination information, to the switch port of the network device. The controller of the switch is further configured to transfer each frame of data, received from the switch port, to one or more of the first network ports of the network device based on one or more of i) the source information inserted into the frame of data and ii) the destination information inserted into the frame of data. Each one of the first network ports is configured to, prior to transmitting a given frame of data transferred to the respective one of the first network ports by the controller, remove each of i) the source information inserted into the given frame of data and ii) the destination information inserted into the given frame of data.

In general, in one aspect, an apparatus is provided and includes first ports to receive first frames of data into the apparatus, and to transmit second frames of the data from the apparatus. Each of the first ports includes a respective port ingress circuit to insert, into each of the first frames of the data received by the respective one of the first ports, source information identifying the respective one of the first ports. A second port transmits the first frames of the data from the apparatus to receive the second frames of the data into the apparatus. Each of the second frames of the data, when received by the second port, includes destination information identifying one or more of the first ports. A controller transfers each of the first frames of the data from the first ports to the second port, and transfers each of the second frames of the data from the second port to one or more of the first ports according to the destination information in the second frame of the data. Each of the first ports further includes a respective port egress circuit to remove the destination information from each of the second frames of the data before the respective one of the first ports transmits the second frame of the data from the apparatus.

In some implementations, the controller transfers each of the second frames of the data from the second port to the respective one or more of the first ports identified by the destination information in the second frame of the data. In some implementations, one or more of the second frames of the data includes source information representing one of the first ports. The controller transfers each of the one or more of the second frames of the data to one or more of the first ports according to the destination information, and the source information, in each of the one or more of the second frames of the data. The port egress circuits in the one or more of the first ports remove the source information from each of the second frames of the data before the one or more of the first ports transmits the second frame of the data from the apparatus. In some implementations, when one of the second frames of the data includes source information that identifies one of the first ports, the controller transfers the one of the second frames of the data to all of the first ports except the one of the first ports. In some implementations, the first and second frames include Ethernet frames. Some implementations include an integrated circuit including the apparatus. Some implementations include a wireless access point including the apparatus. Some implementations include a game console including the apparatus.

In general, in one aspect, the disclosure features a method for an apparatus including first ports and a second port. The method includes: receiving first frames of the data into the apparatus at the first ports; transmitting second frames of the data from the apparatus at the first ports; inserting, into each of the first frames of the data received into the apparatus at a respective one of the first ports, source information identifying the respective one of the first ports; and transmitting the first frames of the data from the apparatus at the second port; receiving the second frames of the data into the apparatus at the second port. Each of the second frames of the data, when received at the second port, includes destination information identifying one or more of the first ports. The method further includes: transferring each of the first frames of the data from the first ports to the second port; transferring each of the second frames of the data from the second port to one or more of the first ports according to the destination information in the second frame of the data; and removing the destination information from each of the second frames of the data before the respective one of the first ports transmits the second frame of the data from the apparatus.

In some implementations, each of the second frames of the data are transferred from the second port to the respective one or more of the first ports identified by the destination information in the second frame of the data. In some implementations, one or more of the second frames of the data includes source information representing one of the first ports; Each of the one or more of the second frames of the data are transferred to one or more of the first ports according to the destination information, and the source information, in each of the one or more of the second frames of the data. The source information is removed from each of the second frames of the data before transmitting the second frames of the data from the apparatus at the first ports. In some implementations, when one of the second frames of the data includes source information that identifies one of the first ports, the one of the second frames of the data are transferred to all of the first ports except the one of the first ports. In some implementations, the first and second frames include Ethernet frames. Some implementations include an integrated circuit to perform the method.

In general, in one aspect, the disclosure features an apparatus including ports to receive frames of data into the apparatus, and to transmit the frames of the data from the apparatus. The ports include one or more first ports and one or more second ports. A memory stores associations between the ports and network addresses. A controller transfers the frames among the ports according to the associations between the ports and the network addresses stored in the memory. When a first one of the frames is received into the apparatus by one of the first ports and has a destination network address that is not associated with any of the ports, the controller transfers the first one of the frames to all of the ports except the one of the first ports. When a second one of the frames is received into the apparatus by one of the second ports and has a destination network address that is not associated with any of the ports, the controller transfers the second one of the frames to all of the ports including the one of the second ports.

In some implementations, the memory stores associations between the network addresses and trunks of a remote device. Before transmitting the frames of data from the apparatus, each of the second ports inserts, into each of the frames of the data, a destination trunk indicator indicating one or all of the trunks of the remote device. In some implementations, each of the frames of the data received into the apparatus by one of the second ports includes a source trunk identifier identifying one of the trunks of the remote device. Each of the first ports, on receiving one of the frames of the data received into the apparatus by one of the second ports, removes the source trunk identifier before transmitting the one of the frames of the data from the apparatus. In some implementations, the first and second frames include Ethernet frames. Some implementations include an integrated circuit including the apparatus. Some implementations include an Ethernet switch including the apparatus. Some implementations include a game console including the apparatus.

In general, in one aspect, the disclosure features a method for an apparatus including ports including one or more first ports and one or more second ports. The method includes: receiving frames of data into the apparatus; transmitting the frames of the data from the apparatus; storing associations between the ports and network addresses; transferring the frames among the ports according to the associations between the ports and the network addresses; transferring a first one of the frames to all of the ports except one of the first ports when the first one of the frames is received into the apparatus by the one of the first ports and has a destination network address that is not associated with any of the ports; and transferring a second one of the frames to all of the ports including one of the second ports when the second one of the frames is received into the apparatus by the one of the second ports and has a destination network address that is not associated with any of the ports.

Some implementations include storing associations between the network addresses and trunks of the remote device. Before transmitting each of the frames of data from the apparatus at one of the second ports, inserting, into the frame, a destination trunk indicator indicating one or all of the trunks of the remote device. In some implementations, each of the frames of the data received into the apparatus by one of the second ports includes a source trunk identifier identifying one of the trunks of the remote device, further including: removing the source trunk identifier from each of the frames of the data received into the apparatus by one of the second ports before transmitting the frames of the data from the apparatus from one of the first ports. In some implementations, the first and second frames include Ethernet frames. The network addresses include media access control (MAC) addresses. Some implementations include an integrated circuit to perform the method.

In general, in one aspect, the disclosure features a frame including: a preamble; a start frame delimiter; a destination media access control (MAC) address; a source MAC address; a source trunk tag including a source device indicator representing a device that originated the frame, and a source trunk number representing a port of the device that received the frame into the device; a length/type; MAC client data; and a frame check sequence.

In general, in one aspect, the disclosure features a frame including: a preamble; a start frame delimiter; a destination trunk tag including a DA_Trunk bit that is set when a destination trunk number of a device is known for the frame, and is clear otherwise, and a DA_Trunk_ID representing the destination trunk number; a destination media access control (MAC) address; a source MAC address; a length/type; MAC client data; and a frame check sequence.

Some implementations include a source trunk tag including a source device indicator representing a device that originated the frame, and a source trunk number representing a port of the device that received the frame into the device.

In general, in one aspect, the disclosure features an apparatus including: first port means for receiving first frames of data into the apparatus, and for transmitting second frames of the data from the apparatus, Each of the first port means includes respective port ingress means for inserting, into each of the first frames of the data received by the respective one of the first port means, source information identifying the respective one of the first port means. Second port means is provided for transmitting the first frames of the data from the apparatus, and for receiving the second frames of the data into the apparatus. Each of the second frames of the data, when received by the second port means, includes destination information identifying one or more of the first port means. Controller means is provided for transferring each of the first frames of the data from the first port means to the second port means, and for transferring each of the second frames of the data from the second port means to one or more of the first port means according to the destination information in the second frame of the data. Each of the first port means further includes respective port egress means for removing the destination information from each of the second frames of the data before the respective one of the first port means transmits the second frame of the data from the apparatus.

In some implementations, the controller means transfers each of the second frames of the data from the second port means to the respective one or more of the first port means identified by the destination information in the second frame of the data. In some implementations, one or more of the second frames of the data includes source information representing one of the first port means. The controller means transfers each of the one or more of the second frames of the data to one or more of the first port means according to the destination information, and the source information, in each of the one or more of the second frames of the data. The port egress means in the one or more of the first port means remove the source information from each of the second frames of the data before the one or more of the first port means transmits the second frame of the data from the apparatus. In some implementations, when one of the second frames of the data includes source information that identifies one of the first port means, the controller means transfers the one of the second frames of the data to all of the first port means except the one of the first port means. In some implementations, the first and second frames include Ethernet frames. Some implementations include an integrated circuit including the apparatus. Some implementations include a wireless access point including the apparatus. Some implementations include a game console including the apparatus.

In general, in one aspect, the disclosure features a computer program for an apparatus including first ports and a second port. The computer program includes instructions for: the apparatus receiving first frames of the data into the apparatus at the first ports; causing the apparatus to transmit second frames of the data from the apparatus at the first ports; inserting, into each of the first frames of the data received into the apparatus at a respective one of the first ports, source information identifying the respective one of the first ports; causing the apparatus to transmitting the first frames of the data from the apparatus at the second port; and the apparatus receiving the second frames of the data into the apparatus at the second port. Each of the second frames of the data, when received at the second port, includes destination information identifying one or more of the first ports. The instructions further include: causing the apparatus to transfer each of the first frames of the data from the first ports to the second port; causing the apparatus to transfer each of the second frames of the data from the second port to one or more of the first ports according to the destination information in the second frame of the data; and removing the destination information from each of the second frames of the data before the respective one of the first ports transmits the second frame of the data from the apparatus.

In some implementations, each of the second frames of the data are transferred from the second port to the respective one or more of the first ports identified by the destination information in the second frame of the data. In some implementations, one or more of the second frames of the data includes source information representing one of the first ports. Each of the one or more of the second frames of the data are transferred to one or more of the first ports according to the destination information, and the source information, in each of the one or more of the second frames of the data. The source information is removed from each of the second frames of the data before transmitting the second frames of the data from the apparatus at the first ports. In some implementations, when one of the second frames of the data includes source information that identifies one of the first ports, the one of the second frames of the data are transferred to all of the first ports except the one of the first ports. In some implementations, the first and second frames include Ethernet frames. Some implementations include an integrated circuit to perform the computer program.

In general, in one aspect, the disclosure features an apparatus including port means for receiving frames of data into the apparatus, and for transmitting the frames of the data from the apparatus. The port means including one or more first port means and one or more second port means. Memory means is provided for storing associations between the port means and network addresses. Controller means is provided for transferring the frames among the port means according to the associations between the port means and the network addresses stored in the memory means. When a first one of the frames is received into the apparatus by one of the first port means and has a destination network address that is not associated with any of the port means, the controller means transfers the first one of the frames to all of the port means except the one of the first port means. When a second one of the frames is received into the apparatus by one of the second port means and has a destination network address that is not associated with any of the port means, the controller transfers the second one of the frames to all of the port means including the one of the second port means.

In some implementations, the memory means stores associations between the network addresses and trunks of a remote device. Before transmitting the frames of data from the apparatus, each of the second port means inserts, into each of the frames of the data, a destination trunk indicator indicating one or all of the trunks of the remote device. In some implementations, each of the frames of the data received into the apparatus by one of the second port means includes a source trunk identifier identifying one of the trunks of the remote device. Each of the first port means, on receiving one of the frames of the data received into the apparatus by one of the second port means, removes the source trunk identifier before transmitting the one of the frames of the data from the apparatus. In some implementations, the first and second frames include Ethernet frames. Some implementations include an integrated circuit including the apparatus. Some implementations include an Ethernet switch including the apparatus. Some implementations include a game console including the apparatus.

In general, in one aspect, the disclosure features a computer program for an apparatus including ports including one or more first ports and one or more second ports, the computer program including instructions for: the apparatus receiving frames of data into the apparatus; causing the apparatus to transmit the frames of the data from the apparatus; storing associations between the ports and network addresses; causing the apparatus to transfer the frames among the ports according to the associations between the ports and the network addresses; causing the apparatus to transfer a first one of the frames to all of the ports except one of the first ports when the first one of the frames is received into the apparatus by the one of the first ports and has a destination network address that is not associated with any of the ports; and causing the apparatus to transfer a second one of the frames to all of the ports including one of the second ports when the second one of the frames is received into the apparatus by the one of the second ports and has a destination network address that is not associated with any of the ports.

Some implementations include storing associations between the network addresses and trunks of the remote device; and before transmitting each of the frames of data from the apparatus at one of the second ports, inserting, into the frame, a destination trunk indicator indicating one or all of the trunks of the remote device. In some implementations, each of the frames of the data received into the apparatus by one of the second ports includes a source trunk identifier identifying one of the trunks of the remote device. The source trunk identifier is removed from each of the frames of the data received into the apparatus by one of the second ports before transmitting the frames of the data from the apparatus from one of the first ports. In some implementations, the first and second frames include Ethernet frames. The network addresses include media access control (MAC) addresses. Some implementations include an integrated circuit to perform the computer program.

The details of one or more implementations are set forth in the accompanying drawings and the description below. Other features will be apparent from the description and drawings, and from the claims.

Figure 1:
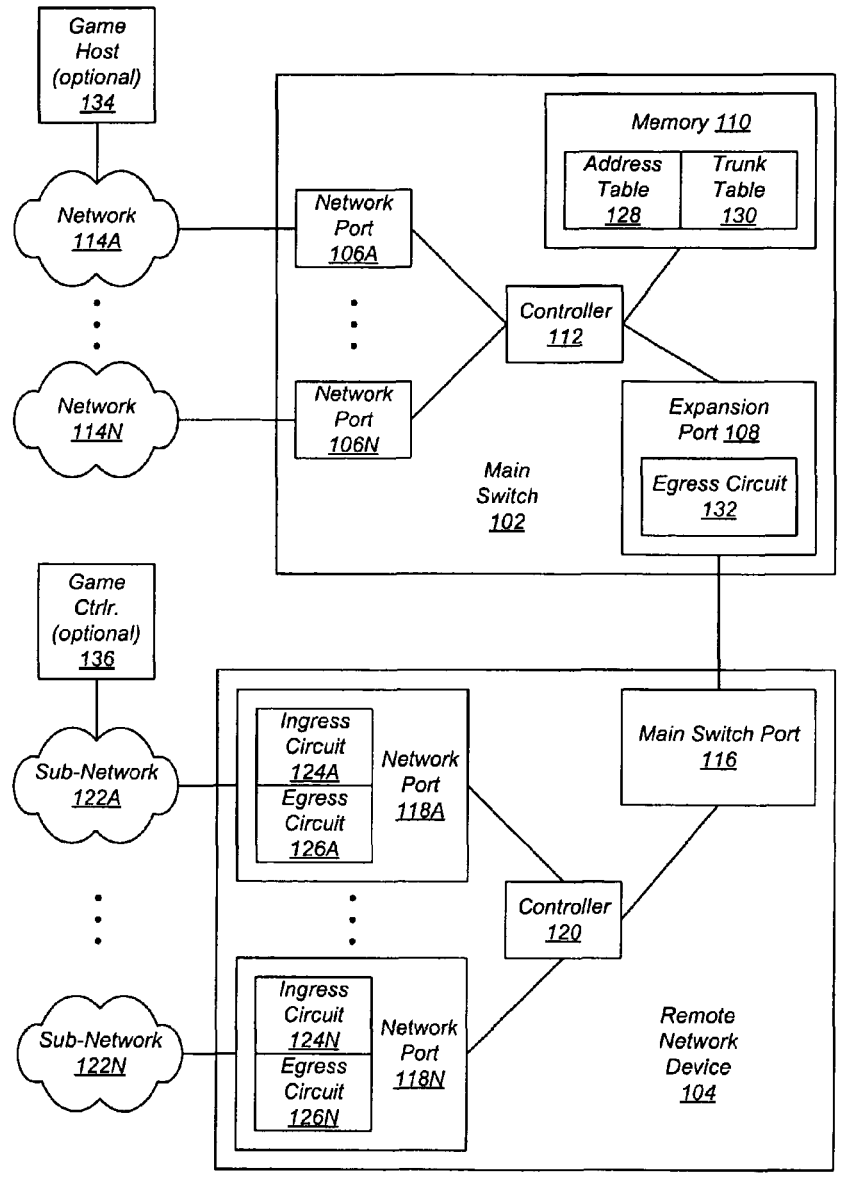
FIG. 1 shows a main switch connected to a remote network device according to the present disclosure.

The leading digit(s) of each reference numeral used in this specification indicates the number of the drawing in which the reference numeral first appears.

DESCRIPTION

Implementations of the present disclosure provide a main switch to switch frames of data on behalf of a remote network device. Implementations of the present disclosure also provide the remote network device.

FIG. 1 shows a main switch 102 connected to a remote network device 104 according to the present disclosure. Main switch 102 is preferably implemented as an Ethernet switch, although other implementations are contemplated. Main switch 102 includes ports 106, 108 to transmit and receive frames of data, the ports 106, 108 including at least one network port 106 and at least one expansion port 108, a memory 110 to store switching data as described in detail below, and a controller 112 to transfer frames of data between ports 106, 108. One or more networks 114A-N can be connected to network ports 106. A remote network device 104 can be connected to each of expansion ports 108.

Remote network device 104 is preferably implemented as a wireless access point, although other implementations are contemplated. For example, remote network device 104 can be implemented as an additional Ethernet switch. Remote network device 104 includes ports 116, 118 to transmit and receive frames of data, the ports 116, 118 including at least one main switch port 116 and network ports 118A-N, and a controller 120 to transfer frames of data between ports 116, 118. A main switch 102 can be connected to main switch port 116. Each network port 118 can be a physical or logical port that can serve one of sub-networks 122A-N such as wireless base station sub-systems. Each network port 118 includes a respective port ingress circuit 124A-N and a respective port egress circuit 126A-N, which can be implemented in hardware, software, or any combination thereof.

Some implementations include a game console that incorporates one or both of main switch 102 and remote network device 104. According to such implementations, an optional game host 134 exchanges frames of game data with main switch 102. Optional game host 134 preferably includes a processor to execute game software, and can be implemented within main switch 102 or can communicate with main switch 102 over a network port 106 as shown in FIG. 1. One or more optional game controllers 136 exchange the frames of game data with remote network device 104 using network ports 118. Optional game controllers 136 can be dependent upon the game console, or can be stand-alone game devices each incorporating a processor to execute game software.

Figure 2:
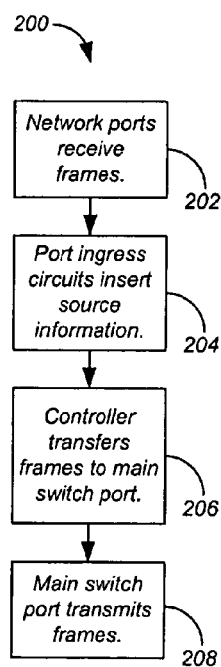
FIG. 2 shows a process for the remote network device of FIG. 1 for handling frames received into the remote network device by a network port according to the present disclosure.

FIG. 2 shows a process 200 for remote network device 104 of FIG. 1 for handling frames received into remote network device 104 by network ports 118 according to of the present disclosure. While process 200 is described in terms of a wireless access point handling Ethernet frames, other implementations are contemplated. Referring again to FIG. 1, network ports 118 receive frames of data into remote network device 104 from sub-networks 122 (step 202). Each port ingress circuit 124 inserts, into each of the frames of the data received by the respective network port 118, source information identifying the respective network port 118 (step 204). For example, each network port 118 is assigned a trunk number, and each port ingress circuit 124, on receiving a frame of data from the associated sub-network 122, inserts the trunk number of the network port 118 into the frame. In one implementation, the trunk number is inserted into each frame as a 5-bit binary number between the sources address field and the length/type field, as described below, although of course other implementations are contemplated.

Remote network device 104 does no switching for the frames, instead relying upon main switch 102 to switch the frames, as described in detail below. Therefore controller 120 simply transfers each of the frames from network ports 118 to main switch port 116 (step 206), which transmits the frames from remote network device 104 (step 208).

Figure 3:
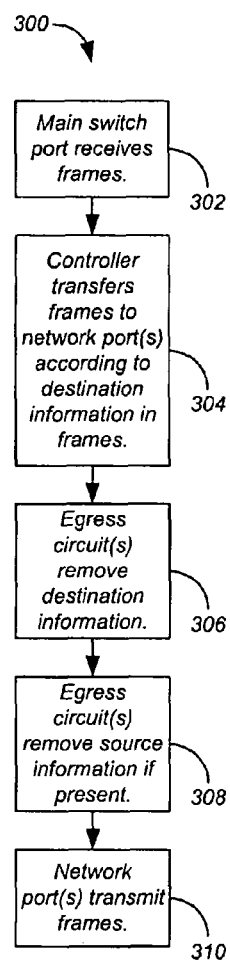
FIG. 3 shows a process for the remote network device of FIG. 1 for handling frames received into the remote network device by a main switch port according to the present disclosure.

FIG. 3 shows a process 300 for remote network device 104 of FIG. 1 for handling frames received into remote network device 104 by main switch port 116 according to of the present disclosure. While process 300 is described in terms of a wireless access point handling Ethernet frames, other implementations are contemplated. Referring again to FIG. 1, main switch port 116 receives frames of data from main switch 102 (step 302).

Each of the frames, when received into remote network device 104 by main switch port 116, includes destination information identifying one or more of network ports 118. For example, each network port 118 is assigned a trunk number, and each of the frames includes a destination trunk ID that identifies one or more of the trunk numbers. Preferably the destination trunk ID identifies the trunk number of the network port 118 serving the sub-network 122 including the network device to which the frame is addressed when the trunk number is known, and identifies all of the network ports 118 when the trunk number is unknown. Preferably the destination trunk ID is generated and inserted into each frame by main switch 102, as described in detail below.

Controller 120 transfers each of the frames to one or more of network ports 118 according to the destination information in the frame (step 304). In particular, when the destination trunk ID in a frame identifies only one of network ports 118, controller 120 transfers the frame only to that network port 118, and when the trunk ID indicates that the destination trunk is unknown, controller 120 transfers the frame to all of network ports 118.

In some implementations the frames include source information representing one of network ports 118, and controller 120 transfers the frames of the data to one or more of network ports 118 according to the destination information, and the source information, in the frames. For example, when one of the sub-networks 122 served by remote network device 104 includes the source of the frame, the frame includes the trunk number of the network port 118 serving the source sub-network 122, as described above with reference to FIG. 2. When the destination information indicates that the destination trunk is unknown, controller 120 uses the source information to transfer such frames to all of the network ports 118 except the source port 118 (that is, the network port 118 serving the source sub-network 122). In other implementations, controller 120 transfers such frames to one or all of the network ports 118 regardless of the source information when the destination information indicates that the destination trunk number is known or unknown. Such implementations permit the source and destination network devices for a frame to reside in the same sub-network 122.

Egress circuits 126 in network ports 118 remove the destination information from each of the frames before network ports 118 transmit the frames from remote network device 104 (step 306). For frames that also include source information, egress circuits 126 also remove the source information before network ports 118 transmit the frames from remote network device 104 (step 308). Network ports 118 then transmit the frames from remote network device 104 (step 310).

Figure 4:
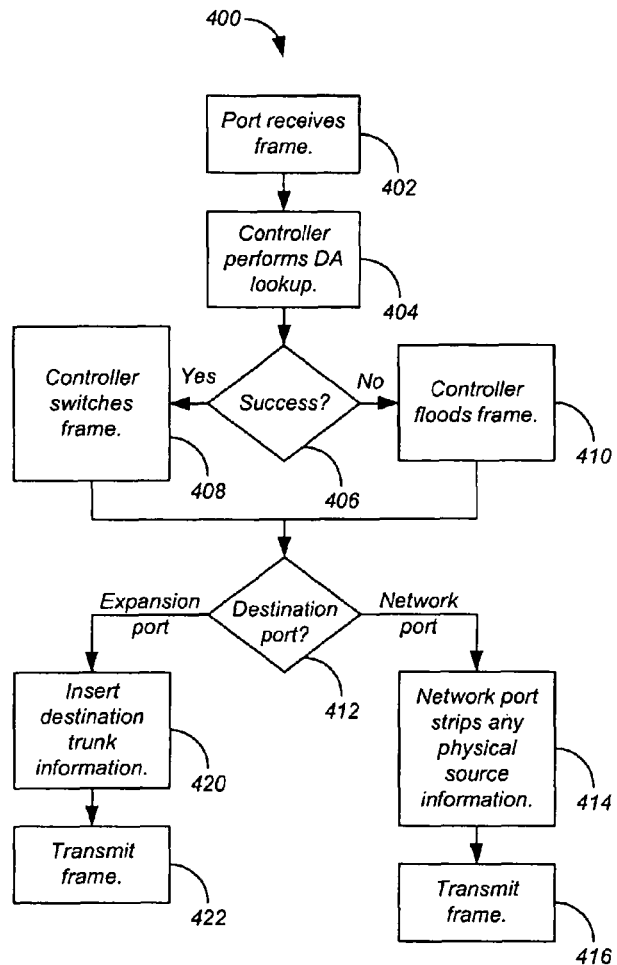
FIG. 4 shows a process for the main switch of FIG. 1 according to the present disclosure.

FIG. 4 shows a process 400 for main switch 102 of FIG. 1 according to of the present disclosure. While process 400 is described in terms of an Ethernet switch handling Ethernet frames including media access control (MAC) addresses, other implementations are contemplated. Referring again to FIG. 1, ports 106, 108 receive frames of data into main switch 102 (step 402).

For each received frame, controller 112 performs a destination address lookup (step 404) to determine whether the destination MAC address of the frame has an entry in an address table 128 stored in memory 110 that associates the address with one of ports 106, 108 (step 406). Address table 128 is preferably populated by learning the associations according to techniques well-known in the relevant arts. Preferably learning includes associating the address with the port 106, 108 from which the frame came or the trunk ID assigned to the frame, if any.

When the destination address lookup succeeds (that is, the frame includes a trunk ID or has a destination MAC address that is associated with one or more of ports 106, 108, or is associated with a trunk ID), controller 112 switches the frame according to the lookup results (step 408). That is, if the lookup returns one or more ports, controller 112 transfers the frame only to the port(s) associated with the destination MAC address. But if the lookup returns one or more trunk IDs, controller 112 first looks up the trunk ID(s) in a trunk table 130 stored in memory 110 that associates trunk ID(s) with ports 106, 108 in main switch 102 and network ports 118 in remote network device 104, and then transfers the frame to those ports. Trunk table 130 is preferably loaded by software that assigns the trunk IDs to the ports 106, 108 (directly), and thus to port 118 (indirectly).

But when the destination address lookup fails (that is, the frame has a destination MAC address that is not associated with any of ports 106, 108 or trunk IDs), controller 112 floods the frame to ports 106, 108. For a frame received on one of network ports 106, controller 112 floods the frame to all of ports 106, 108 except the network port 106 that received the frame. For a frame received on expansion port 108, controller 112 floods the frame to all of network ports 106 and expansion port 108. The frame is flooded to expansion port 108 because both the source and destination devices for the frame may lie within the sub-networks 122 served by remote network device 104.

Frames to be egressed from one of network ports 106 (step 412) may include source information inserted by remote network device 104, as described above. Network ports 106 remove such source information from the frames (step 414) before transmitting the frames from main switch 102 (step 416).

Before transmitting a frame from main switch 102 on expansion port 108 (step 412), an egress circuit 132 in expansion port 108 inserts the trunk lookup result (from step 404) into the frame (step 420) before transmitting the frame (step 422).

But if the trunk lookup (step 404) did not result in a trunk ID, controller 112 inserts, into the frame, a flag or destination trunk ID indicating the failure, for example by clearing a bit to zero. In one implementation, the trunk number is inserted into the frame as a 5-bit binary number including a one-bit flag between the start of frame delimiter and the destination address field, as described below, although of course other implementations are contemplated.

Figure 5:
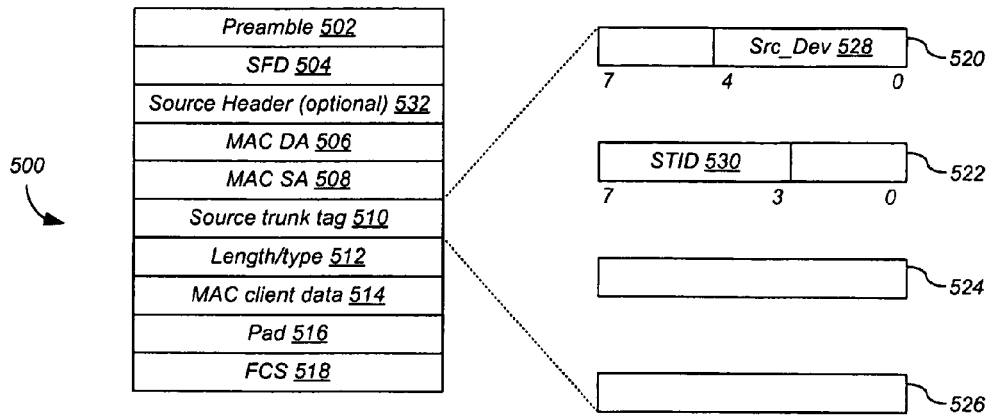
FIG. 5 shows the format of a frame transmitted by a main switch port from the remote network device of FIG. 1 according to the present disclosure.

FIG. 5 shows the format of a frame 500 transmitted by main switch port 116 from remote network device 104 according to of the present disclosure. Frame 500 includes a 7-octet preamble 502, a 1-octet start frame delimiter (SD) 504, an optional 2-octet source header 532, a 6-octet MAC destination address (DA) 506, a 6-octet MAC source address (SA) 508, a 4-octet source trunk tag 510, a 2-octet length/type 512, MAC client data 514, a variable-size pad 516, and a frame check sequence (FCS) 518. Of course the fields of frame 500 can have different lengths and occur in different sequences than described, as will be apparent to one skilled in the relevant arts after reading this description. However, optional source header 532, when included, should be 2 octets in length, and should precede MAC client data field 514 in order to place any IP address in MAC client data field 514 completely within a single 32-bit word, thereby requiring only a single operation to perform network address translation. Optional 2-octet source header 532 can include any sort of data, or no data at all, for this or other applications.

As mentioned above, source trunk tag 510 preferably includes four octets 520, 522, 524, and 526, although other tag sizes are contemplated. Preferably the first five bits of the first octet 520 of source trunk tag 510 include a five-bit source device (Src_Dev) indicator 528 that is populated by the device that is the source of the frame to indicate the device. Preferably the last five bits of the second octet 522 of source trunk tag 510 represent the source trunk number (STID) 530.

Figure 6:
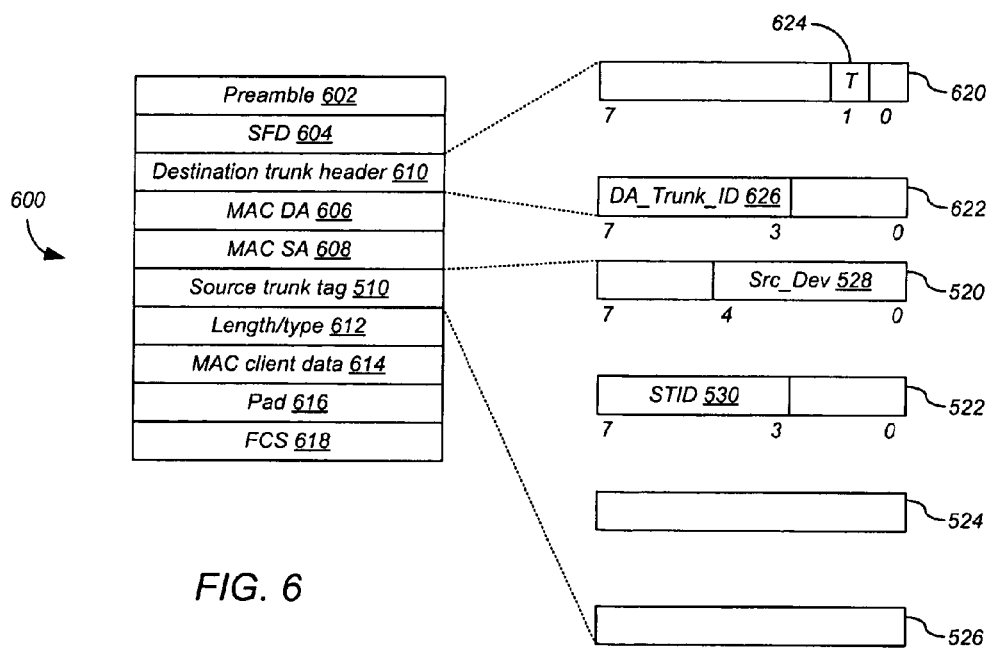
FIG. 6 shows the format of a frame transmitted by an expansion port from the main switch of FIG. 1 according to the present disclosure.

FIG. 6 shows the format of a frame 600 transmitted by expansion port 108 from main switch 102 according to of the present disclosure. Frame 600 includes a 7-octet preamble 602, a 1-octet SFD 604, a 2-octet destination trunk header 610, a 6-octet MAC destination address (DA) 606, a 6-octet MAC source address (SA) 608, 4-octet source trunk tag 510, a 2-octet length/type 612, MAC client data 614, a variable-size pad 616, and a frame check sequence (FCS) 618. Of course the fields of frame 600 can have different lengths and occur in different sequences than described, as will be apparent to one skilled in the relevant arts after reading this description.

As mentioned above, destination trunk tag 610 preferably includes two octets 620 and 622, although other tag sizes are contemplated. However, the 2-octet length will place any IP address in MAC client data field 614 completely within a single 32-bit word, thereby requiring only a single operation to perform network address translation. Preferably the second bit of first octet 620 of destination trunk tag 610 includes a DA_Trunk bit (T) 624 that is set by controller 112 of main switch 102 when the destination trunk lookup (step 404 of FIG. 4) returns a trunk association and cleared otherwise. When DA_Trunk bit 624 is set, the last five bits of second octet 622 of destination trunk tag 610 includes a DA_Trunk_ID 626 that represents the destination trunk number from the destination trunk lookup.

When the destination trunk number of a frame received into remote network device 104 by main switch port 116 is unknown (bit 624=0), controller 120 optionally determines whether remote network device 104 was the source device of the frame (that is, whether the frame was originally received into remote network device 104 by one of network ports 118) by examining Src_Dev indicator 528. If Src_Dev indicator 528 indicates that remote network device 104 is the source device of the frame, then remote network device 104 floods the frame to all of network ports 118 except the network port 118 indicated by source trunk number 530 (if mapping frames back to the original source port is not desired).

Referring now to FIGS. 7A-7E, various exemplary implementations of the present disclosure are shown.

Figure 7B:
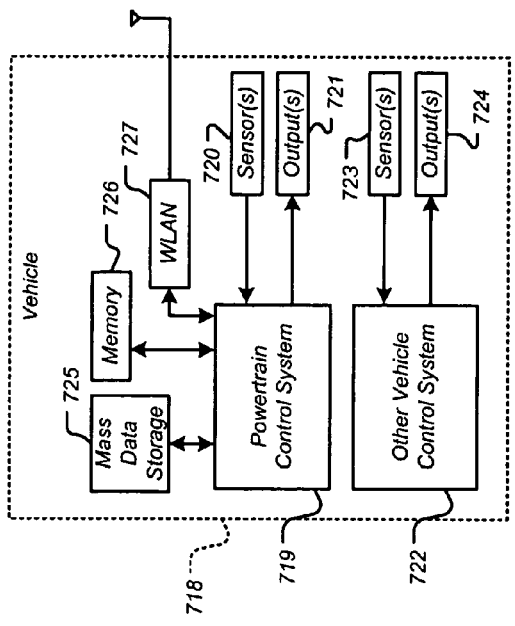
FIGS. 7A-7E show various exemplary implementations of the present disclosure are shown.
Figure 7A:
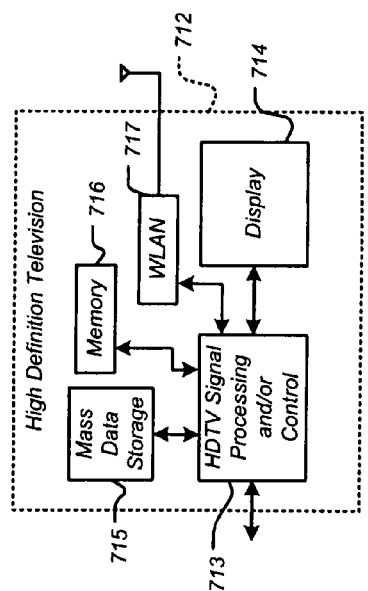

Referring now to FIG. 7A, the present disclosure can be implemented in a high definition television (HDTV) 712. The present disclosure may implement either or both signal processing and/or control circuits, which are generally identified in FIG. 7A at 713, a WLAN interface and/or mass data storage of the HDTV 712. The HDTV 712 receives HDTV input signals in either a wired or wireless format and generates HDTV output signals for a display 714. In some implementations, signal processing circuit and/or control circuit 713 and/or other circuits (not shown) of the HDTV 712 may process data, perform coding and/or encryption, perform calculations, format data and/or perform any other type of HDTV processing that may be required.

The HDTV 712 may communicate with mass data storage 715 that stores data in a nonvolatile manner such as optical and/or magnetic storage devices. The HDD may be a mini HDD that includes one or more platters having a diameter that is smaller than approximately 1.8". The HDTV 712 may be connected to memory 716 such as RAM, ROM, low latency nonvolatile memory such as flash memory and/or other suitable electronic data storage. The HDTV 712 also may support connections with a WLAN via a WLAN network interface 717.

Referring now to FIG. 7B, the present disclosure implements a control system of a vehicle 718, a WLAN interface and/or mass data storage of the vehicle control system. In some implementations, the present disclosure implements a powertrain control system 719 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present disclosure may also be implemented in other control systems 722 of the vehicle 718. The control system 722 may likewise receive signals from input sensors 723 and/or output control signals to one or more output devices 724. In some implementations, the control system 722 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 719 may communicate with mass data storage 725 that stores data in a nonvolatile manner. The mass data storage 725 may include optical and/or magnetic storage devices for example hard disk drives HDD and/or DVDs. The HDD may be a mini HDD that includes one or more platters having a diameter that is smaller than approximately 1.8". The powertrain control system 719 may be connected to memory 726 such as RAM, ROM, low latency nonvolatile memory such as flash memory and/or other suitable electronic data storage. The powertrain control system 719 also may support connections with a WLAN via a WLAN network interface 727. The control system 722 may also include mass data storage, memory and/or a WLAN interface (all not shown).

Figure 7C:
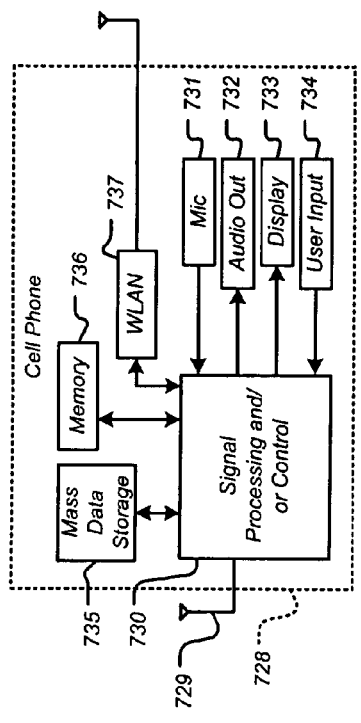

Referring now to FIG. 7C, the present disclosure can be implemented in a cellular phone 728 that may include a cellular antenna 729. The present disclosure may implement either or both signal processing and/or control circuits, which are generally identified in FIG. 7C at 730, a WLAN interface and/or mass data storage of the cellular phone 728. In some implementations, the cellular phone 728 includes a microphone 731, an audio output 732 such as a speaker and/or audio output jack, a display 733 and/or an input device 734 such as a keypad, pointing device, voice actuation and/or other input device. The signal processing and/or control circuits 730 and/or other circuits (not shown) in the cellular phone 728 may process data, perform coding and/or encryption, perform calculations, format data and/or perform other cellular phone functions.

The cellular phone 728 may communicate with mass data storage 735 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 728 may be connected to memory 736 such as RAM, ROM, low latency nonvolatile memory such as flash memory and/or other suitable electronic data storage. The cellular phone 728 also may support connections with a WLAN via a WLAN network interface 737.

Figure 7D:
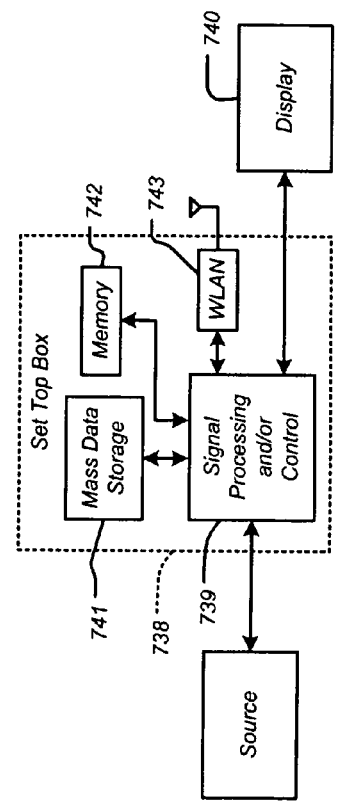

Referring now to FIG. 7D, the present disclosure can be implemented in a set top box 738. The present disclosure may implement either or both signal processing and/or control circuits, which are generally identified in FIG. 7D at 739, a WLAN interface and/or mass data storage of the set top box 738. The set top box 738 receives signals from a source such as a broadband source and outputs standard and/or high definition audio/video signals suitable for a display 740 such as a television and/or monitor and/or other video and/or audio output devices. The signal processing and/or control circuits 739 and/or other circuits (not shown) of the set top box 738 may process data, perform coding and/or encryption, perform calculations, format data and/or perform any other set top box function.

The set top box 738 may communicate with mass data storage 743 that stores data in a nonvolatile manner. The mass data storage 743 may include optical and/or magnetic storage devices for example hard disk drives HDD and/or DVDs. The HDD may be a mini HDD that includes one or more platters having a diameter that is smaller than approximately 1.8". The set top box 738 may be connected to memory 742 such as RAM, ROM, low latency nonvolatile memory such as flash memory and/or other suitable electronic data storage. The set top box 738 also may support connections with a WLAN via a WLAN network interface 743.

Figure 7E:
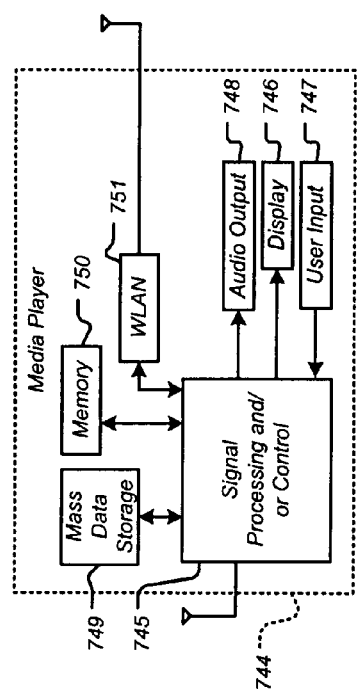

Referring now to FIG. 7E, the present disclosure can be implemented in a media player 744. The present disclosure may implement either or both signal processing and/or control circuits, which are generally identified in FIG. 7E at 745, a WLAN interface and/or mass data storage of the media player 744. In some implementations, the media player 744 includes a display 746 and/or a user input 747 such as a keypad, touchpad and the like. In some implementations, the media player 744 may employ a graphical user interface (GUI) that typically employs menus, drop down menus, icons and/or a point-and-click interface via the display 746 and/or user input 747. The media player 744 further includes an audio output 748 such as a speaker and/or audio output jack.

The signal processing and/or control circuits 745 and/or other circuits (not shown) of the media player 744 may process data, perform coding and/or encryption, perform calculations, format data and/or perform any other media player function.

The media player 744 may communicate with mass data storage 749 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 744 may be connected to memory 750 such as RAM, ROM, low latency nonvolatile memory such as flash memory and/or other suitable electronic data storage. The media player 744 also may support connections with a WLAN via a WLAN network interface 751. Still other implementations in addition to those described above are contemplated.

The implementations disclosed herein can be implemented in digital electronic circuitry, or in computer hardware, firmware, software, or in combinations of them. Apparatuses disclosed herein can be implemented in a computer program product tangibly in a machine-readable storage device for execution by a programmable processor. Methods disclosed herein can be performed by a programmable processor executing a program of instructions to perform functions by operating on input data and generating output. The techniques disclosed herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for storing computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of the disclosure. Accordingly, other implementations are within the scope of the following claims.

What is claimed:

1. A console comprising:
a switch; and
a network device, wherein the network device comprises
a switch port in communication with the switch, wherein the switch is separate from the network device;
a plurality of first network ports, wherein each of the plurality of first network ports is configured to (i) receive a frame of data, and (ii) insert source information into the frame of data, wherein the source information in each frame of data, received by the plurality of first network ports, identifies the first network port that received the frame of data; and
a controller configured to transfer each frame of data, including the source information, to the switch via the switch port,
wherein the switch is configured to
add to each frame of data transferred to the switch, destination information identifying one or more of the plurality of first network ports, and
transfer each frame of data, including both the source information and the destination information, to the switch port of the network device,
wherein the controller of the switch is further configured to transfer each frame of data, received from the switch port, to one or more of the plurality of first network ports of the network device based on one or more of i) the source information inserted into the frame of data and ii) the destination information inserted into the frame of data, and
wherein each one of the plurality of first network ports is configured to, prior to transmitting a given frame of data transferred to the respective one of the plurality of first network ports by the controller, remove each of i) the source information inserted into the given frame of data and ii) the destination information inserted into the given frame of data.

2. The console of claim 1, wherein the controller is configured to transfer each one of the frames of data, received from the switch port, to a respective one of the plurality of network ports according to the destination information in the respective one of the frames of data.

3. The console of claim 1, wherein:
the frames of data received by the plurality of first network ports are received from respective networks; and
the plurality of first network ports are configured to remove the source information in the frames of data, received from the switch port, prior to transmitting the frames of data, received from the switch port, to the respective networks.

4. The console of claim 1, wherein:
the controller is configured to transfer each one of the frames of data, received from the switch port, to one or more of the plurality of first network ports according to the destination information in the respective one of the frames of data, received from the switch port; and
the destination information in the respective one of the frames of data, received from the switch port, identifies one or more of the plurality of first network ports.

5. The console of claim 1, wherein the controller is configured to transfer each one of the frames of data, received from the switch port, to one or more of the plurality of first network ports based on the destination information and the source information in the respective one of the frames of data, received from the switch port.

6. The console of claim 1, wherein:
the controller is configured to transfer one of the frames of data, received from the switch port, to all of the plurality of first network ports except one of the plurality of first network ports when one of the frames of data, received from the switch port, comprises source information; and the source information of the one of the frames of data, received from the switch port, identifies the one of the plurality of first network ports.

7. The console of claim 1, wherein the switch comprises a plurality of second network ports, wherein a first port of the plurality of second network ports is configured to receive the frames of data transferred from the switch port to the switch, wherein each of the frames of data, transferred from the switch port to the switch, comprise the source information, wherein the source information identifies one of the plurality of first network ports.

8. The console of claim 7, wherein the switch comprises a second controller configured to (i) determine the destination information for each of the frames of data, transferred from the switch port to the switch, based on the source information, (ii) insert the destination information into the frames of data, transferred from the switch port to the switch, and (iii) transmit the frames of data, transferred from the switch port to the switch, including the destination information from the first port to the switch port, wherein the destination information in each of the frames of data, transferred from the first port to the switch port, identifies one of the plurality of first network ports.

9. The console of claim 8, further comprising memory configured to store associations between the source information and the destination information of the frames of data, transferred from the first port to the switch port,
wherein the controller is configured to (i) access the destination information in the memory based on the source information, and (ii) transfer the frames of data, transferred from the first port to the switch port, to at least one of the switch port and a second port of the plurality of second network ports based on the destination information.

10. The console of claim 9, wherein:
the source information in the memory comprises identifiers of the plurality of first network ports; and
the destination information in the memory comprises addresses of the plurality of first network ports.

11. The console of claim 10, wherein:
the source information in one of the frames of data, transferred from the switch port to the switch, identifies a first port of the plurality of first network ports;
the second controller determines destination information for the one of the frames of data, transferred from the switch port to the switch; and
the destination information for the one of the frames of data, transferred from the switch port to the switch, identifies a second port of the plurality of first network ports.

12. The console of claim 8, further comprising memory configured to store associations between the plurality of second network ports and network addresses, wherein:
the plurality of second network ports are configured to (i) receive frames of data from respective networks, and (ii) transmit the frames of data from the respective networks to the switch port via a second port of the plurality of second network ports; and
wherein the second controller is configured to transfer the frames of data, received from the switch, between the plurality of second network ports according to the associations between the plurality of second network ports and the network addresses stored in the memory.

13. The console of claim 12, wherein the second controller is configured to transfer a first frame of the frames of data, received from the switch, to all of the plurality of second network ports except one of the plurality of second network ports when the first frame (i) is received into the switch by the one of the plurality of second network ports, and (ii) has a first address that is not associated with any of the plurality of second network ports.

14. The console of claim 12, wherein the controller is configured to transfer a second frame of the frames of data, received from the switch, to all of the plurality of second network ports when the second frame of the frames of data, received from the switch, (i) is received into the switch by one of the plurality of second network ports, and (ii) has a second address that is not associated with any of the plurality of second network ports.

15. The console of claim 8, further comprising memory configured to store (i) first associations between the plurality of first network ports and first network addresses, and (ii) second associations between the plurality of second network ports and second network addresses,
wherein the second controller is configured to, based on the first associations and the second associations, transfer the frames of data with the destination information to the first port or to another port of the plurality of second network ports.

16. The console of claim 8, further comprising memory configured to store associations between (i) network addresses of the frames of data, transferred from the first port to the switch port, and (ii) identifiers of the plurality of first network ports,
wherein the second controller is configured to (i) access one of the identifiers from the memory based on an address of one of the frames of data, transferred from the switch port to the switch, and (ii) insert into the one of the frames of data, transferred from the switch port to the switch, the one of the identifiers prior to transmitting the one of the frames of data, transferred from the switch port to the switch, from the switch to the network device.

17. The console of claim 16, wherein the one of the identifiers identifies one of the plurality of first network ports from which one of the frames of data, transferred from the switch port to the switch, is to be transmitted from the network device.

18. The console of claim 8, further comprising memory configured to store associations between (i) network addresses of the frames of data, transferred from the first port to the switch port, and (ii) identifiers of the plurality of network ports, wherein:
the second controller is configured to (i) access one of the identifiers from the memory based on an address of one of the frames of data, transferred from the switch port to the switch, and (ii) insert into the one of the frames of data, transferred from the switch port to the switch, the one of the identifiers prior to transmitting the one of the frames of data, transferred from the switch port to the switch, from the switch; and
the one of the identifiers identifies one or more of the plurality of second network ports from which the one of the frames of data, transferred from the switch port to the switch, is to be transmitted from the switch.

19. The console of claim 8, wherein the first port is configured to insert into each of the frames of data, transferred from the switch port to the switch, an identifier identifying one or all of the plurality of first network ports prior to transmitting the frames of data, transferred from the first port to the switch port, from the switch to the network device.

20. The console of claim 8, wherein:
the plurality of second network ports is configured to receive frames of data;

each of the frames of data, received by one of the plurality of second network ports, comprises a source identifier;

the source identifier identifies one of the first port or another one of the plurality of second network ports; and each of the plurality of second network ports removes the source identifier from the frames of data, received by one of the plurality of second network ports, prior to transmitting the frames of data, received by one of the plurality of second network ports, from the switch.

* * * * *